United States Patent [19]
Kaschemekat

[11] Patent Number: 5,294,345
[45] Date of Patent: Mar. 15, 1994

[54] MEMBRANE MODULE ASSEMBLY

[75] Inventor: Jürgen Kaschemekat, Palo Alto, Calif.

[73] Assignee: Membrane Technology and Research, Inc., Menlo Park, Calif.

[21] Appl. No.: 12,012

[22] Filed: Feb. 1, 1993

[51] Int. Cl.⁵ .................... B01D 61/36; B01D 63/02
[52] U.S. Cl. ................... 210/640; 210/321.8; 210/321.89; 210/500.23
[58] Field of Search ............ 203/11; 210/634, 640, 210/644, 321.78-321.8, 321.87-321.89, 500.23

[56] References Cited

U.S. PATENT DOCUMENTS

| Re. 33,678 | 11/1989 | Campbell et al. | 55/16 |
| 4,316,774 | 2/1982 | Trusch | 203/11 |
| 4,787,919 | 11/1988 | Campbell et al. | 55/16 |
| 5,151,191 | 9/1992 | Sunaoka et al. | 210/644 |

Primary Examiner—Frank Sever
Attorney, Agent, or Firm—J. Farrant

[57] ABSTRACT

A membrane module assembly adapted to provide a flow path for the incoming feed stream that forces it into prolonged heat-exchanging contact with a heating or cooling mechanism. Membrane separation processes employing the module assembly are also disclosed. The assembly is particularly useful for gas separation or pervaporation.

20 Claims, 2 Drawing Sheets

MEMBRANE MODULE ASSEMBLY

This invention was made with support from the U.S. Government under Contract Number DE FC 02-90 CE40903 from the Department of Energy. The Government has certain rights in this invention.

FIELD OF THE INVENTION

This invention relates to membrane separation, specifically to membrane modules. More particularly, the invention relates to a membrane module adapted to provide a flow path for the incoming feed stream that forces it into prolonged heat-exchanging contact with a heating or cooling mechanism.

BACKGROUND OF THE INVENTION

Many membrane processes are temperature-sensitive. For example, the selectivity of a gas-separation membrane for one gas over another often increases as the temperature of the gas decreases. On the other hand, the feed gas may need to be warmed to keep water vapor or other condensable components from liquefying within the membrane module. The performance of a pervaporation system is usually improved by heating the feed liquid, because this raises the vapor pressure on the feed side, increasing the transmembrane driving force and hence the transmembrane flux. In ultrafiltration, it may be necessary to keep the liquids under treatment within a specific temperature range, to prevent spoilage of food products, for example. In hemodialysis, careful temperature control is clearly extremely important. In any membrane process, the feed stream may contain labile compounds that must be kept cool. Conversely, solutions may contain solutes that will crystallize out unless the solution is kept above certain temperature.

It is apparent that there are numerous situations where an ability to warm or cool the feed stream is useful. This can, of course, be achieved by direct or indirect heating or chilling at some point upstream from the membrane module, but this may necessitate insulation of feed lines and membrane system to maintain the desired temperature during the membrane separation operation.

SUMMARY OF THE INVENTION

The invention is a membrane module assembly, including a membrane module, a housing and an outer jacket through which heating or cooling fluids can be passed. The membrane module may be of any type, but will typically be cylindrical, with a feed inlet at or close to one end. The module is mounted in its housing, also typically cylindrical, which contains the appropriate feed, residue and permeate ports, to permit a feed stream to be supplied to the module, and residue and permeate streams to be withdrawn from the module. The module is oriented within the housing so that the feed inlet to the module is at the end of the module that is distant from the feed port. This unconventional orientation is extremely important, because it means that the feed stream entering the housing is forced to flow down the length of the housing between the housing and the outer wall of the module before entering the module for treatment. The housing is partially or fully encased by an outer jacket, creating a housing that is at least in part double-walled, with the walls spaced apart, leaving a hollow area or compartment through which heating or cooling fluids can be circulated. The inlet for these fluids is positioned at one end of the jacket and the outlet at the other, so that the heating or cooling fluid flows down the length of the hollow compartment between the housing outer wall and the jacket inner wall. Thus, the feed stream flows in contact with the inner wall of the housing; the heating or cooling fluid flows in contact with the outer wall of the housing. In this manner, the feed stream can be warmed or cooled by heat exchange with the heating or cooling fluid to any desired temperature. The housing is preferably made of a good heat conductor, to facilitate heat transfer between the feed stream and the heating or cooling fluid.

This configuration has several advantages. The need for a separate heater, chiller or heat exchanger upstream of the membrane module is avoided. The heating or cooling jacket serves both to bring the feed stream to the desired temperature and to insulate the membrane module. Thus, it is easier to maintain the feed stream at the desired temperature up to the entry point into the module and during passage through the module than with conventional designs.

This feature is beneficial in all membrane separation applications, but is particularly valuable for gas separation or pervaporation, in which a change of temperature of the fluid under treatment is intrinsic to the separation process. In the case of pervaporation, the process involves an intrinsic liquid-to-vapor phase change, and the latent heat of evaporation needed to accomplish this change results in significant cooling of the feed and permeate streams. In the case of gas separation, adiabatic Joule-Thompson expansion takes place as the gas permeates the membrane, with corresponding cooling of the permeate and residue streams. In both of these situations, the module itself will also be cooled, and upstream heating cannot maintain the module or product stream temperatures, whereas the assembly of the invention can do so. Furthermore, the heat capacity of gases is small compared with liquids. Even if the external heat exchanger is located very close to the membrane module, therefore, and even if the transfer lines and the module are insulated, it is very difficult to keep the module at a chosen temperature by relying solely on the heat-carrying capacity of the incoming gas stream.

In addition, the design is versatile and can be applied to various types of modules and separations.

The above summary describes the most preferred assembly that makes use of a fluid-carrying jacket. Other methods of heating or cooling, such as a fluid-carrying coil wrapped around the housing, or an electric heating element, are also contemplated.

The invention also includes membrane separation processes carried out using the novel module assembly.

It is to be understood that the above summary and the following detailed description are intended to explain and illustrate the invention without restricting its scope.

DETAILED DESCRIPTION OF THE INVENTION

The invention has two aspects: one, a membrane module assembly and two, a membrane separation process using the assembly.

Figure 1:
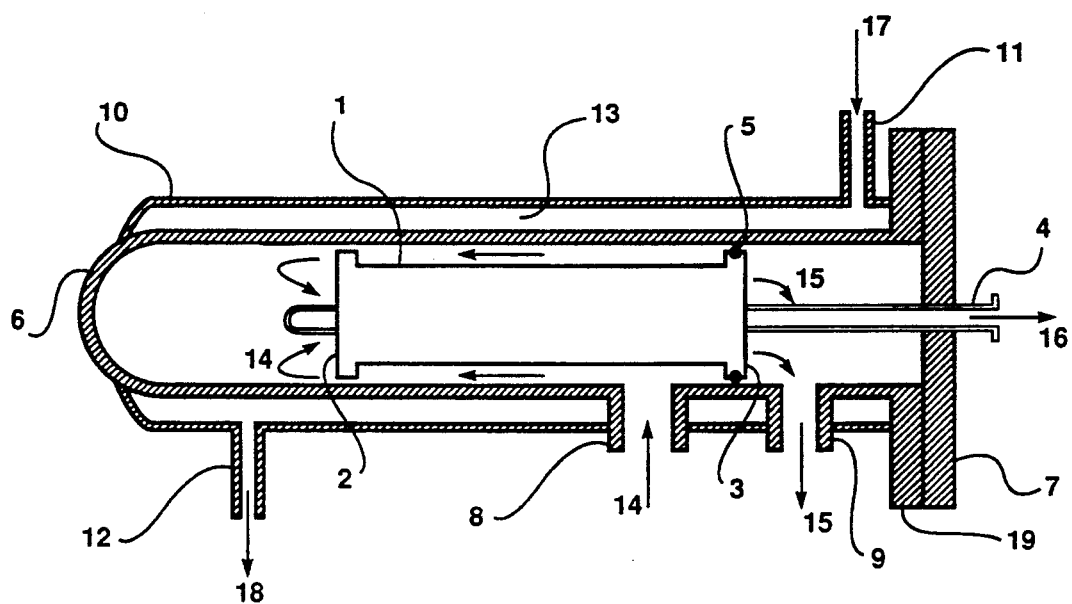
FIG. 1 is a schematic drawing showing a basic module assembly and indicating the flow pattern of fluids through the assembly.

A basic embodiment of the assembly is shown in FIG. 1, in which the elements of the drawing are identified as follows:

1 Membrane module
2 Feed inlet
3 Residue outlet
4 Permeate outlet
5 Seal
6 Housing
7 End plate
8 Feed port
9 Residue port
10 Jacket
11 Inlet for heating or cooling fluid
12 Outlet for heating or cooling fluid
13 Hollow compartment
14 Direction of feed stream flow
15 Direction of residue stream flow
16 Direction of permeate stream flow
17/18 Direction of heating or cooling fluid flow
19 Flanges The membrane module, 1, may be any type of membrane module used to package separation membranes, including, but not limited to, a spiral-wound module, a hollow-fiber module, a tubular module and a plate-and-frame module. FIG. 1 shows, for representative purposes only, a spiral-wound module, typically used for separations such as reverse osmosis, gas separation or pervaporation. In this type of module, the feed stream usually enters the module at one end, 2, and the permeate stream, flowing as generally indicated by arrow, 16, is withdrawn through a permeate collection pipe, 4. The residue stream exits through the other end, 3. It will be apparent to those of skill in the art that an assembly essentially the same as that shown in FIG. 1 could be used for any other module in which the feed stream enters at, or close to, one end, such as a hollow-fiber module, a tubular module or a plate-and-frame module. The shell in which the membranes are packaged may be of any conventional or convenient material, for example plastic, fiberglass, metal or glass.

The module is mounted in a housing, 6, which has a feed port, 8, through which the incoming feed stream enters and a residue port, 9 through which the residue stream is withdrawn. The module is oriented within the housing so that the feed inlet end, 2, is distant from the feed port. Consequently, a feed stream entering the housing is forced to flow down the length of the housing between the housing and the outer wall of the module, as generally indicated by arrows, 14, before entering the module for treatment. The residue is port is positioned near the residue end of the module, so that the residue stream flows as generally indicated by arrows, 15. Seal, 5, isolates the feed and residue streams and supports the module in position within the housing. This seal is preferably a U-cup or O-ring seal, or any type of seal that permits easy removal of the module from the housing for replacement or repair. Alternatively the module can simply be glued in place. It is convenient to provide the housing with flanges, 19. The module can then be inserted through the open, flanged end and the housing can be closed by bolting on, or otherwise attaching, an end plate, 7, through which the permeate pipe outlet, 4, passes. A Swagelock fitting or the like (not shown in the figure) may conveniently be used to connect the permeate pipe emerging from the module to the pipe outlet that passes through the end plate. The housing and end plate may be made from a variety of materials familiar to those skill in the art. Metal housings and end plates are preferred, because they provide good conduction of heat between the heating or cooling fluid and the feed stream, and they withstand high-pressure operation. For example, stainless steel schedule 5, 10, 40 or 80 is appropriate for the housing.

The housing is partially or fully encased by an outer jacket, 10. FIG. 1 shows a representative arrangement in which the jacket covers the length of the housing, but not the ends. It will be apparent to those of skill in the art that it is desirable in some situations to provide a more complete jacket by encasing either the end of the housing within which the feed stream flows or both ends. Likewise, there may be situations where it is preferred that the jacket extends over only part of the length of the housing. The jacket has a larger diameter than the housing, so that the inner wall of the jacket and the outer wall of the housing define a compartment, 13, through which heating or cooling fluids can be passed. The jacket is fitted with two ports, 11 and 12, through which such fluids can enter and leave the compartment. FIG. 1 shows the fluid flowing in as indicated by arrow 17 and out as indicated by arrow 18, so that the heating or cooling fluid flows cocurrent with the feed stream. Embodiments in which 12 is the inlet port and 11 is the outlet port, so that the heating or cooling fluid flows countercurrent with the feed stream are also intended to be within the scope of the invention. As with the housing, the jacket may be made from stainless steel, another metal or any other convenient material.

The fluid flowing within the jacket can be either a liquid or a gas and can either warm or cool the feed stream. Embodiments such as that of FIG. 1 are preferred because it is often possible to utilize heating or cooling fluids that are already available at the site where the membrane system is to operate. These fluids may even be waste streams whose heating or cooling capacity can be tapped with essentially no additional expenditure of energy. Non-limiting examples of cooling fluids that can be used, depending on the initial feed stream temperature and the desired feed stream temperature, include indirect coolants, such as water, brine or glycol, all of which are commonly available at many industrial plants. Alternatively, refrigerants such as CFC-11 or CFC-12 can be pumped directly through the unit, especially if very low temperatures are required. Non-limiting examples of heating fluids that can be used include water, steam or hot gases, such as off-gases from on-site processes. Depending on the system configuration, operating temperature and type of membrane process, it may be possible to utilize at least a portion of the residue or the permeate stream from the separation process as a heating or cooling fluid, with or without some supplementary heating or cooling. This type of arrangement allows very good heat integration within the process, thereby minimizing expenditure on external heating or cooling.

In addition to bringing the feed stream to the desired temperature, the heating or cooling fluid also has the effect of insulating the membrane module. Depending on the environment in which the membrane system is to be located, and the temperature difference between the heating or cooling fluid and the outside environment, the jacket itself may be insulated.

Figure 2:
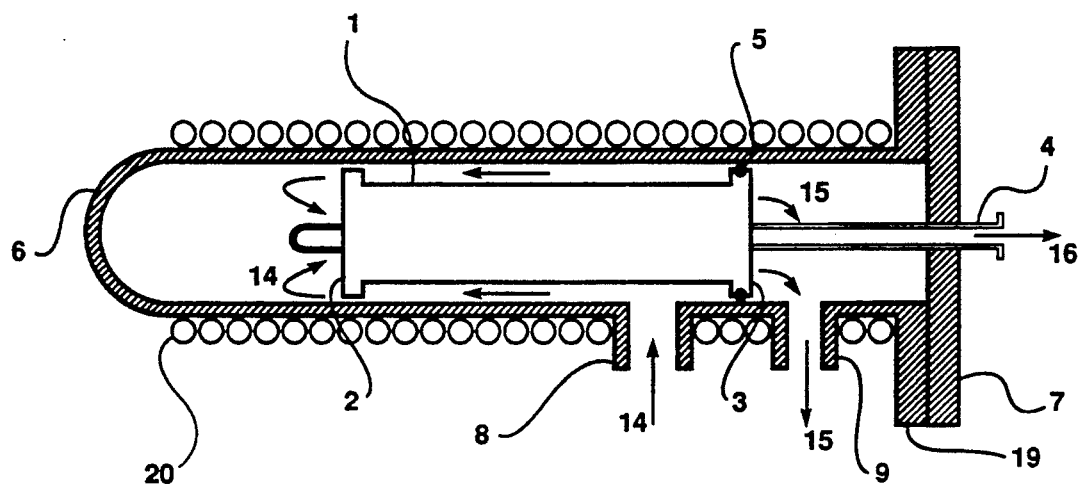
FIG. 2 is a schematic drawing showing an alternative module assembly in which a heating or cooling coil is used.

The embodiment of FIG. 1 shows the heating or cooling as being achieved by a jacket through which fluid is passed. This method of heating or cooling is generally preferred for reasons of economy, because, as stated above, fluids already used or produced on-site may be diverted to the membrane unit with little extra energy cost. FIG. 2 shows an alternative method of heating or cooling, in which a fluid-carrying coil, 20, is wrapped around the housing in close proximity with the outer surface of the housing. A disadvantage of this approach is that the heating or cooling liquid is not in direct contact with the outer wall of the housing, so that heat transfer may be less efficient. An advantage is that the coil, if flexible, need not be a permanent part of the assembly, but can be attached when needed.

It will be apparent to those of skill in the art that a variety of other means could be used to provide the heating or cooling effect. For example, an electric heating element could be wound around the housing in the same manner as that shown in FIG. 2. What is important is that the feed stream entering the housing travels along the inner surface of the housing before entering the membrane module for treatment. In this way, both feed stream and module are maintained at the correct temperature.

In another aspect, the invention concerns membrane separation processes carried out using the novel module assembly. It is envisaged that the module assembly will be usable in diverse membrane separation applications, such as gas separation, pervaporation, ultrafiltration and microfiltration, dialysis and reverse osmosis.

Separation processes using the novel module assembly are particularly advantageous in the areas of gas separation and pervaporation, where a change of temperature of the fluid under treatment is intrinsic to the separation process. In the case of gas separation, adiabatic Joule-Thompson expansion takes place as the gas permeates the membrane, with corresponding cooling of the permeate and residue streams, and hence the module itself. If the gas contains water vapor or organic vapors, for example, this cooling may bring the gas to the dewpoint temperature of one or more components, causing condensation of that component within the module. Such condensation can lead to a number of problems, including corrosion of system components, loss of membrane performance due to presence of liquid on the membrane surface, damage to the membrane, breakdown of glues or other module components or catastrophic failure.

Another consideration in gas separation is that the heat capacity of gases is small compared with liquids. In situations where the gas separation conditions demand a temperature that is substantially higher or lower than that of the environment in which the membrane separation system is placed, it may be difficult or impossible to bring and keep the module and housing to the desired temperature by relying solely on the heat-carrying capabilities of the gas stream to be treated.

In gas separation, processes in which the feed gas stream is cooled can be easily carried out by following the teachings of the invention. As just one example, chemical plants produce a variety of chlorinated, fluorinated or brominated organic compounds. During manufacture, storage, transfer or use of the compounds, many types of stream containing a halogenated organic mixed with air or nitrogen are produced. Such streams can be treated by a membrane separation process to remove and recover the organic compound from the stream. Some halogenated hydrocarbons can be very well separated from air at ambient temperatures by presently available membranes. For example, the MTR-100 series commercial membrane has a selectivity for 1,1,2-trichloroethane over nitrogen of 60, measured at room temperature. The same membrane has a selectivity for methylene chloride/nitrogen of 50 and for CFC-11/nitrogen of 45. On the other hand, the room-temperature selectivity of the membrane for some CFC compounds is low, for example CFC-114/nitrogen about 10, and for some brominated compounds over nitrogen is much less than 10, for example, Halon 1301 ($CF_3Br$)/nitrogen about 3. It is generally considered that a selectivity of more than 10, and preferably more than 20, is needed for a cost-effective separation process. It is known, however, that the selectivity of a membrane for one gas over another sometimes increases with decreasing temperature. For example, in the case of Halon 1301, this increase is substantial. MTR has measured a selectivity for Halon 1301/nitrogen with gas mixtures rising steadily to 25 at $-40°$ C. Processes in accordance with the invention can be used to carry out the required separation at low temperature, by passing an appropriate coolant through the jacket to lower the feed stream temperature to $-20°$ C., $-30°$ C. or $-40°$ C. Cooling brines in this temperature range are often already available on-site at chemical plants.

Gas separation processes in which the feed gas stream is heated are also contemplated. Non-limiting examples of feed gas streams where heating may be beneficial include gas streams that contain water vapor, such as air streams, natural gas streams, etc., or gas streams containing easily condensable organic compounds. Condensation of liquid water on the membrane surface or elsewhere within the membrane module or housing may reduce the membrane permeation rate or cause corrosion damage to system components. Condensation of organic compounds may create a liquid that attacks the membrane, glues, spacers or other components within the membrane module and may cause catastrophic failure of the membrane or module. The process of the invention avoids these problems by maintaining the feed gas stream at a temperature comfortably above the dew point for a stream of that composition. By using a suitable heating fluid, temperatures anywhere in the range from 30° C. to 100° C. or above may be achieved. For the lower end of this range, a suitable heating fluid would be hot water, which is often available in large quantities at industrial plants. For higher temperatures, low-grade stream, which again is often available as a waste product in plants, can be used. Other alternatives include a variety of hot process gases and liquids or waste gases and liquids. Another alternative is direct heating by means of an electric heating element, etc.

In the case of pervaporation, the process involves an intrinsic liquid-to-vapor phase change, and the latent heat of evaporation needed to accomplish this change results in cooling of the feed and permeate streams, and hence the module itself. This cooling can be substantial. In the pervaporation of an aqueous solution, for example, if 5% of the feed stream permeates the membrane, the latent heat of evaporation required would result in a drop in temperature of the module of as much as 20°-30° C. The membrane separation performance would be adversely affected by a drop in temperature of this magnitude.

In pervaporation, the driving force for transmembrane permeation is provided by the difference in partial vapor pressure of the stream components on the feed and permeate sides of the membranes. This driving force can be increased by heating the feed stream, thereby raising the equilibrium vapor pressure on the feed side. Pervaporation processes are, therefore, often carried out with the feed stream at above ambient temperature. Most polymer membranes are not resistant to temperatures above about 100°-150° C., but even modest heating of the feed stream, for example to 40° C., 50° C., 60° C., 70° C. or 80° C. results in substantial improvements in transmembrane fluxes. Such heating can be easily achieved using water, steam or other fluids in the module assembly of the invention, or less preferably, by another type of direct or indirect heating.

In both pervaporation and gas separation, the invention overcomes problems of heat loss or gain by simultaneously bringing the feed solution to an appropriate temperature, transferring heat to the membrane module and maintaining the module at the correct temperature irrespective of heating or cooling effects going on within the module as a result of the separation process.

I claim:

1. A membrane module assembly comprising:
   (i) a membrane module, having a feed end for receiving a feed stream;
   (ii) an inner housing having feed, residue and permeate ports, said membrane module being mounted in said inner housing such that said feed port is distal from said feed end;
   (iii) a means, at least partially encasing said inner housing, for heating or cooling said housing.

2. The assembly of claim 1, wherein said means comprises an outer jacket at least partially encasing said inner housing and spaced therefrom to create a compartment through which fluid can be passed in heat-transferring relationship with said feed stream as it travels from said feed port to said feed end.

3. The assembly of claim 1, wherein said means comprises a fluid-carrying coil.

4. The assembly of claim 1, wherein said means comprises an electric heating element.

5. The assembly of claim 1, wherein said module is a spiral-wound module.

6. The assembly of claim 1, wherein said module is a hollow-fiber module.

7. A membrane separation process comprising:
   (a) providing a membrane module assembly comprising;
      (i) a membrane module, having a feed end for receiving a feed stream;
      (ii) an inner housing having feed, residue and permeate ports, said membrane module being mounted in said inner housing such that said feed port is distal from said feed end;
      (iii) a means, at least partially encasing said inner housing, for heating or cooling said housing;
   (b) heating or cooling said housing;
   (c) passing said feed stream into said assembly through said feed port and flowing it substantially along an inner surface of said membrane housing to said feed end;
   (d) separating said feed stream into a residue stream and a permeate stream in said membrane module.

8. The process of claim 7, wherein said means comprises a fluid-carrying coil.

9. The process of claim 7, wherein said means comprises an electric heating element.

10. The process of claim 7, wherein said means comprises an outer jacket at least partially encasing said inner housing and spaced therefrom to create a compartment through which fluid can be passed in heat-transferring relationship with said feed stream as it travels from said feed port to said feed end.

11. The process of claim 10, wherein said fluid comprises water.

12. The process of claim 10, wherein said fluid comprises brine.

13. The process of claim 10, wherein said fluid comprises glycol.

14. The process of claim 10, wherein said fluid comprises a refrigerant.

15. The process of claim 10, wherein said fluid comprises steam.

16. The process of claim 10, wherein said fluid comprises hot gas.

17. The process of claim 10, wherein said fluid comprises at least a portion of said residue stream.

18. The process of claim 10, wherein said fluid comprises at least a portion of said permeate stream.

19. The process of claim 7, wherein said process comprises gas separation.

20. The process of claim 7, wherein said process comprises pervaporation.

* * * * *